United States Patent [19]

Cigolotti et al.

[11] Patent Number: 4,634,109

[45] Date of Patent: Jan. 6, 1987

[54] APPARATUS FOR ADJUSTING THE SPRING CHARACTERISTIC OF A HELICAL SPRING

[75] Inventors: Jean-Pierre Cigolotti, Chassieu; Jean Leblanc, Lyons, both of France

[73] Assignee: Robert Bosch GmbH, Stuttgart, Fed. Rep. of Germany

[21] Appl. No.: 735,929

[22] Filed: May 20, 1985

[30] Foreign Application Priority Data

Jun. 9, 1984 [DE] Fed. Rep. of Germany ....... 3421560

[51] Int. Cl.$^4$ ............................ F16F 1/06; F16F 1/16; F02D 1/04
[52] U.S. Cl. .................................... 267/170; 267/175; 267/177
[58] Field of Search ................ 267/166, 168, 170–179, 267/58–62, 9 R, 9 B, 9 A, 9 C, ; 213/22; 123/502, 497, 495, 373, 449

[56] References Cited

U.S. PATENT DOCUMENTS

| 2,850,274 | 9/1958 | Villar | 267/177 X |
| 3,041,060 | 6/1962 | Jacobsen | 267/177 |
| 3,077,328 | 2/1963 | Nelson | 267/170 X |
| 3,666,257 | 5/1972 | Sorteberg | 267/170 |
| 4,408,591 | 10/1983 | Nakamura | 123/502 |
| 4,505,241 | 3/1985 | Eheim | 123/449 X |

Primary Examiner—Douglas C. Butler
Attorney, Agent, or Firm—Edwin E. Greigg

[57] ABSTRACT

An apparatus for adjusting the spring characteristic of a helical spring has a manually actuatable adjusting element, which comprises a rotational support for the windings of a spiral spring. The apparatus further has a retaining member and an arresting member for retaining and securing the adjusting element in the adjusted positions. To provide a separate adjustability of the spring pitch and the spring biasing, the retaining member and arresting member are embodied such that the adjusting tang is rotatable without its axial position being varied, and is fixable in any rotated position.

12 Claims, 4 Drawing Figures

APPARATUS FOR ADJUSTING THE SPRING CHARACTERISTIC OF A HELICAL SPRING

BACKGROUND OF THE INVENTION

The invention is based on a device for adjusting the spring characteristic of a helical spring as generally defined hereinafter.

In a known apparatus of this type for an rpm governor of a fuel injection pump, the retaining member is embodied by a housing having an internal bore, in which the adjusting tang is mounted concentrically on a governor rod and is rotatably retained with a slide collar that protrudes beyond the circumference. The adjusting tang protrudes beyond the housing and there has a hexagonal head intended for engagement with any suitable tool or wrench. The retaining member is embodied as an annular disk which covers the annular opening remaining between the adjusting tang and the housing and is firmly joined to the housing on its annular face oriented toward the interior of the housing and this annular disk has a spur gear. The spur gear is engaged by a similar face gear disposed on the slide collar. The adjusting tang has a helical outer groove, in which a portion of the windings of the helical spring is guided. On the end remote from the adjusting tang, the helical spring is supported on a supporting member that is firmly joined to the governor rod and thereby presses the two spur gears into one another. To vary the spring characteristic, the hexagonal head of the adjusting tang msut be rotated, in the course of which the spur gears act as a sort of slip coupling, and depending on the direction of rotation the adjusting tang is screwed increasingly farther out of or into the helical spring. In either case, the number of windings available in the free spring length of the helical spring is varied, and hence the spring stiffness is changed. Additionally, in the first case the spring bias is increased, while in the second case it is decreased. Thus when adjusting the spring characteristic, varying the pitch of the spring steepness is inseparably associated with varying or prestressing the spring.

In a further known apparatus of the above type for adjusting the spring stiffness of an rpm governor spring in a fuel injection pump, the retaining member is embodied by a strut-like housing part which has a threaded through bore. The adjusting tang, embodied as a screw, can be screwed with its external thread into the internal thread of the threaded through bore. The arresting member is embodied as a nut mounted on the adjusting tang; by being rotated, the nut can be pressed on the helical thread of the adjusting tang on the housing, thus securing the instantaneus rotational position of the adjusting tang. The adjusting tang protrudes into the interior of the helical spring and has two radially offstanding pins, preferably on the end oriented toward the helical spring, which pin protrude between the windings of the helical spring. To adjust the spring characteristic, the nut must be loosened and the adjusting tang rotated appropriately in the housing thread. With the use of the two radial pins, the adjusting tang is thereby screwed to a variable extent into the helical spring. Since the radial pins act as one support of the helical spring, the free spring length of the helical spring is thereby varied. In this known apparatus, the spring biasing is not adjustable.

OBJECT AND SUMMARY OF THE INVENTION

The apparatus for adjusting the spring characteristic of a helical spring according to the invention has the advantage over the prior art that the spring characteristic of the helical spring can be manipulated arbitrarily in terms of both the spring pitch and the spring biasing, and each component can be adjusted independently of the other. Within limits, any desired spring pitch can be established and an arbitrary spring biasing associated with it.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
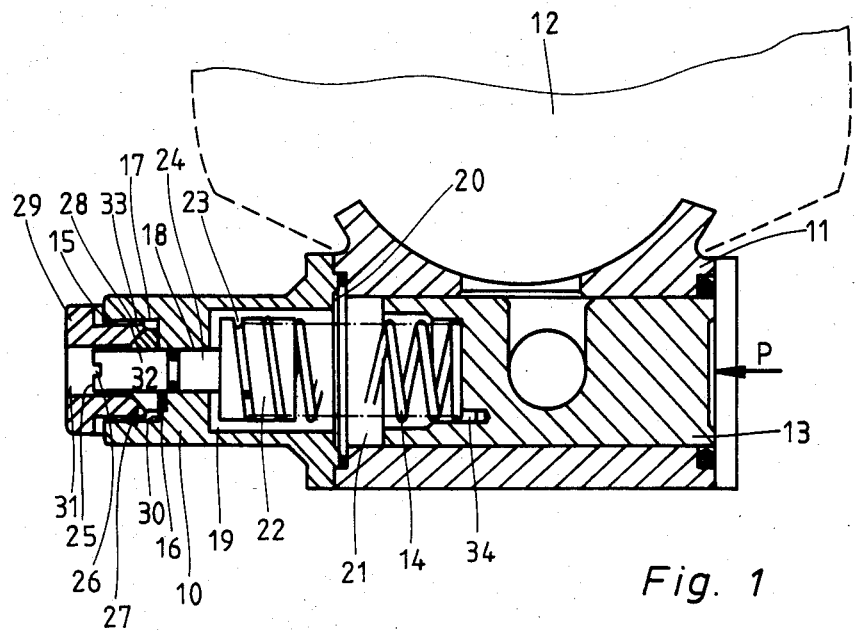
FIGS. 1 and 2 are each longitudinal cross sections taken through an apparatus for adjusting the spring characteristics of a helical compression spring, which acts as a restoring spring for an injection onset adjusting piston in a fuel injection pump.

In FIG. 1, an apparatus for adjusting the spring characteristic of a helical compression spring is shown in longitudinal section; in this exemplary embodiment the helical compression spring serves to fix the control characteristic of a timing device or control piston, which is acted upon by pressure, of a fuel injection pump. A control piston of this kind should be adjustable in a simple manner and within a relatively wide range, and this accordingly can be accomplished by adjusting the spring characteristic of the helical compression spring. With the control piston, the injection onset in a fuel injection pump is adjusted as to the individual operating points in a known manner.

The adjusting apparatus has a housing 10, which is flanged to the housing 11 of a fuel injection pump 12, suggested by dashed lines, in such a manner that a control piston 13 guided in the housing 11 of the fuel injection pump 12 comes into operative engagement with a helical compression spring 14 retained in the housing 10 of the apparatus. The cylinder-like housing 10 has an axial stepped bore 16 beginning at its free end 15, the bore 16 having a first part 17 of larger diameter adapted to be open at the end 15 and a second part 18 of smaller diameter which is arranged to merge directly with the first 17. A further axial bore 19, once again of large diameter, merges directly with the second part 18 and is arranged to open freely into the other end face 20 of the housing 10. The housing wall surrounding the axial bore 19, the housing 11 of the fuel injection pump 12 and the control piston 13 together define a spring chamber 21 surrounding the helical compression spring 14.

Also disposed in the spring chamber 21 is an adjusting tang 22, which protrudes partway into the helical spring 14. This adjusting tang has a helical groove 23 on its circumference with the pitch of the groove arranged to correspond to that of the spring windings of the helical spring 14. The initial windings of the helical spring 14 are in engagement with the groove 23. The bearing neck 24 of the adjusting tang 22 is guided in a rotatable and axially displaceable manner in the second part 18 of the stepped bore 16. This second part 18 also embodies a slide sheath. The bearing neck 24 protrudes into the first part 17 of the stepped bore 16 and on its free end face 25 has an insertion opening or kerf in the form of a diametrically extending slit 26, into which a rotating tool such as a screwdriver can be inserted.

The adjusting tang 22 can be fixed in any arbitrary rotated and axially displaced position by means of an arresting member 27. To this end, the arresting member 27 has an element, affixed onto the bearing neck 24, in the form of a slit frustoconical locking ring 28, which can be fixed by means of a fastening member embodied as a cap screw 29 to the annular shoulder 30 of the stepped bore 16. The cap screw 29 has an axial through bore 31, the internal diameter of which is larger than the outer diameter of the bearing neck 24, and further includes an external thread 32, which can be screwed into an internal thread 33 provided in the first part 17 of the stepped bore 16. With its end face beveled toward the through bore 31, the cap screw 29 engages the conical jacket face of the locking ring 28 and when it is tightened presses the locking ring 28 against the bearing neck 24 on the one hand and against the annular shoulder 30 of the stepped bore 16 on the other. In order that it may be tightened or loosened, the cap screw 29 has a hexagonal or square head, which can be grasped by a suitable wrench.

The mode of operation of the above-described apparatus for adjusting the spring characteristic of the helical spring 14 will now be described, referring to the graph in FIG. 4.

Figure 4:
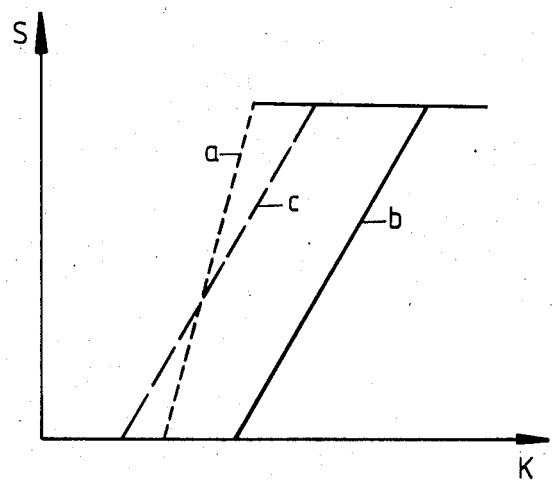
FIG. 4 is a graph showing a plurality of spring characteristics of the helical compression spring in the apparatus shown in FIG. 1 or FIG. 2.

In FIG. 4, three different spring curves or spring characteristics for the helical spring 14 are shown. The compression path s of the helical spring 14 is plotted on the ordinate, and the force K exerted (from the direction of the control piston 13) upon the helical spring 14 is plotted on the abscissa. At the same time, this spring characteristic also corresponds to the control characteristic of the control piston 13, in which case s stands for the displacement path of the control piston 13 and K represents the pressure exerted upon the control piston 13. The instantaneous spring characteristic of the helical compression spring 14 as adjusted in FIG. 1 is shown at a, while curve b is the desired spring characteristic to be attained by means of the adjusting apparatus. This spring characteristic b is attained as follows:

First the cap screw 29 is loosened with a suitable wrench; as a result, the locking ring 28 releases the bearing neck 24 of the adjusting tang 22. Now a screwdriver is inserted into the slit 26 in the end face 25 of the bearing neck 24, and the adjusting tang 22 is rotated in the right-hand direction. As a result, the adjusting tang 22, via its groove 23, is screwed somewhat farther into the helical compression spring 14. Since the end of the adjusting tang 22 oriented toward the helical compression spring 14 represents one support of the helical compression spring 14—which is supported at its other end on the control piston 13 and is secured there against rotating by means of an end 34 of the spring that is bent in the axial direction—the free spring length that is available for the spring compression process is reduced, and the spring pitch is thereby decreased as well. The spring characteristic a of the helical compression spring 14 varies in the direction toward the spring characteristic c of FIG. 4. Once the spring characteristic c has been attained, the rotational movement of the adjusting tang 22 is stopped. Now, by axially displacing the adjusting tang 22 by means of the screwdriver engaging the kerf or slit 26 in the bearing neck 24, the adjusting tang 22 is pushed still further into the spring chamber 21, causing the helical compression spring 14 to be compressed and thereby increasing the spring biasing. The spring characteristic c is shifted parallel in the direction of the spring characteristic b. Once the spring characteristic b has been attained, then the cap screw 29 is tightened again, which presses the locking ring 28 against the bearing neck 24 and the annular shoulder 30, thereby reliably fixing the adjusting tang 22 in the rotated and axially displaced position that has been attained.

Figure 2:
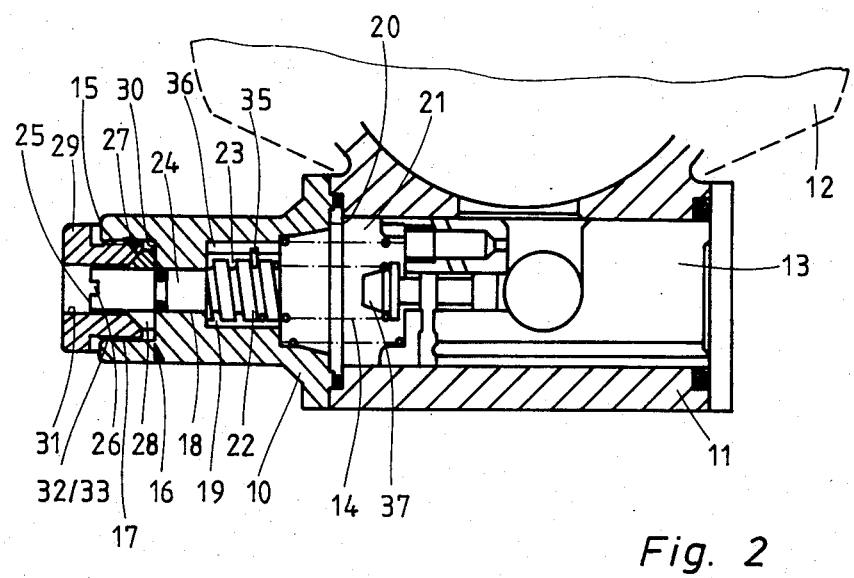

The adjusting apparatus according to the exemplary embodiment of FIG. 2 is substantially identical to the adjusting apparatus described above, so that identical components are identified by the same reference numerals. This adjusting apparatus differs only in that the rotational securing of the helical spring 14 is effected not at the control piston 13 but in the apparatus itself. For this purpose, the end 35 of the last, or first, spring winding of the helical spring 14 resting in the groove 23 of the adjusting tang 22 is bent and protrudes radially beyond the circumference of the adjusting tang 22. This end 35 engages a slit-like axial recess 36 in the wall of the housing 10 surrounding the axial bore 19. Since in this case the control piston 13 is embodied as a follower piston which is controlled by a precontrol piston 37, the helical compression spring 14 is, in this case, supported on the precontrol piston 37 and, as noted above, the spring 35 has a portion which engages the groove 23.

Figure 3:
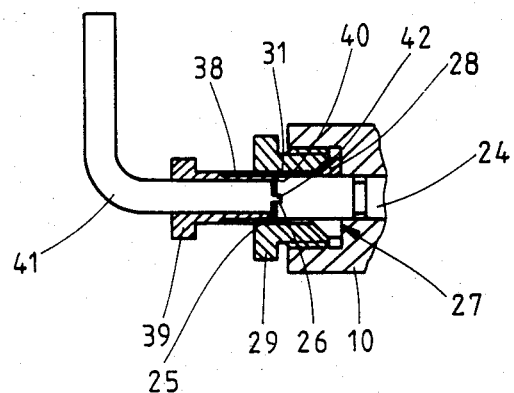
FIG. 3 is a detailed view of the same view in cross section as that provided in FIG. 1 or FIG. 2, but for a further exemplary embodiment of the apparatus.

The adjusting apparatus shown in detail in FIG. 3 for a further exemplary embodiment is identical, except for the detail shown in FIG. 3, to one of the two adjusting apparatuses shown in FIGS. 1 and 2. Identical components are therefore again identified by the same reference numerals. For the sake of finely graduated and more accurate adjustment of the dispalced position of the adjusting tang 22, and hence of the biasing of the helical compression spring 14, the through bore 31 of the cap screw 29 is provided with an internal thread 38, into which a further hollow cap screw 39 can be screwed. The hollow cap screw 39 again has a hexagonal or square head and rests with its annular end face 40 on the free end face 25 which extends beyond the bearing neck 24. In the interior of the hollow cap screw 39, an actuating pin 41 is guided in a rotatable and axially displaceable manner and with a correspondingly embodied tang 42 it form-fittingly engages the slit 26 in the end face 25 of the bearing neck 24. The actuating pin 41 protrudes out from the hollow cap screw 39 and at this location is shown as being bent to form an actuating handle. Once the cap screw 29 is loosened and the bearing neck 24 is accordingly released by the locking ring 28, the axial displacement of the adjusting tang 22 can be performed by rotating the hollow cap screw 29 by means of a suitable wrench. The adjusting tang 22 is rotated via the actuating pin 41; because of its tang 42, the actuating pin 41, when it rotates, causes the adjusting tang 22 to rotate with it.

The invention is not restricted to the abovedescribed exemplary embodiments of an apparatus for adjusting the spring characteristic of a helical compression spring. With the apparatus according to the invention, the spring characteristic of a tensile spring can be adapted and varied in the same manner. Nor is the application of the apparatus described restricted to fuel injection pumps. On the contrary, the invention can be used in many mechanical and hydraulic systems, wherever it is desirable to adjust and adapt spring characteristics without disassembling any equipment.

What is claimed and desired to be secured by Letters Patent of the United States is:

1. An apparatus for adjusting the spring characteristic of a rotationally fixed helical compression spring for adjusting movement of a control device which is in operative engagement with one end of said helical compression spring which comprises: a housing, said housing including a chamber for receiving said helical spring and said control device in axial alignment, said housing including a stepped bore in one end in axial alignment with said chamber, said stepped bore including a larger diameter portion and a smaller diameter portion, said smaller diameter portion being located between said chamber and said larger diameter portion and extending from said chamber to said larger diameter portion, an adjusting tang, said adjusting tang including a large diameter end which extends into said chamber and includes a helical groove along its circumference for receiving one end of said helical spring thereon in engagement with said helical groove and a smaller diameter end which forms a bearing neck portion that extends through said smaller diameter portion of said stepped bore into said larger diameter portion of said stepped bore, an arresting member positioned within said larger diameter bore relative to said bearing neck portion of said tang for fixing said tang in a desired position relative to said chamber, said arresting member including a locking ring that surrounds said bearing neck portion of said adjusting tang and a fastening member for forcing said locking ring against said bearing neck portion to prevent movement of said adjusting tang, and means on an end of said bearing neck portion of said adjusting tang for rotating said adjusting tang relative to said helical compression spring and for axial movment of said adjusting tang relative to said chamber.

2. An apparatus as defined by claim 1, further wherein said fastening member comprises a cap screw having an axial through bore, said through bore having an inside diameter which is larger than said diameter of said bearing neck.

3. An apparatus as defined by claim 2, further wherein said bearing neck of said adjusting tang has a free end face provided with a tool receiving opening.

4. An apparatus as defined by claim 3, further wherein said axial through bore of said cap screw is provided at least partway with an internal thread, a further hollow cap screw adapted to be received in said internal thread of said through bore in said cap screw, and said further hollow cap screw adapted to abut said free end face of said bearing neck.

5. An apparatus as defined by claim 4, further wherein said further hollow cap screw includes a manual actuating pin which protrudes out of said hollow cap screw and is preferably bent at that location and guided in a rotatable and axially displaceable manner, with said manual actuating pin arranged to engage said insertion opening of said bearing neck.

6. An apparatus as defined by claim 2, characterized in that said housing has a further bore in proximity to said bearing neck, said further bore arranged to at least partially receive said adjusting tang and said helical spring.

7. An apparatus as defined by claim 2, further wherein said adjusting tang further including a jacket face, a helical groove on said jacket face, said groove having a pitch adapted to correspond to a pitch of said spring windings of said helical spring, and said spring windings having a portion arranged to rest in said support.

8. An apparatus as defined by claim 1, further wherein said bearing neck of said adjusting tang has a free end face provided with a tool receiving opening.

9. An apparatus as defined by claim 8, further wherein said axial through bore of said cap screw is provided at least partway with an internal thread, a further hollow cap screw adapted to be received in said internal thread of said through bore in said cap screw, and said further hollow cap screw adapted to abut said free end face of said bearing neck.

10. An apparatus as defined by claim 1, further wherein said adjusting tang has a radially outwardly protruding pin which protrudes into a recess in a wall of said housing.

11. An apparatus as defined by claim 10, further wherein said pin is embodied by the bent end of the last spring winding of the helical spring.

12. An apparatus as defined by claim 1, further wherein said adjusting tang further including a jacket face, a helical groove on said jacket face, said groove having a pitch adapted to correspond to a pitch of said spring windings of said helical spring, and said spring windings having a portion arranged to rest in said support.

* * * * *